US00RE42610E

(19) United States
(12) Reissued Patent
Schramm

(10) Patent Number: US RE42,610 E
(45) Date of Reissued Patent: Aug. 16, 2011

(54) SPILL-PROOF BUBBLE MACHINE

(76) Inventor: Michael R. Schramm, Perry, UT (US)

(21) Appl. No.: 12/371,587

(22) Filed: Feb. 14, 2009

Related U.S. Patent Documents

Reissue of:
(64) Patent No.: 5,495,876
Issued: Mar. 5, 1996
Appl. No.: 08/086,541
Filed: Jul. 1, 1993

U.S. Applications:
(63) Continuation of application No. 07/828,345, filed on Jan. 30, 1992, now Pat. No. 5,246,046.

(51) Int. Cl.
*B65B 1/04* (2006.01)
*B65B 3/04* (2006.01)

(52) U.S. Cl. ..... 141/98; 141/336; 446/20

(58) Field of Classification Search ..... 446/15–21, 446/74; 141/331, 339, 340, 364, 98, 94, 141/95, 311 A, 333; 220/731, 734, 719; 222/109, 570, 571, 567, 569; 4/283, 259
See application file for complete search history.

(56) References Cited

U.S. PATENT DOCUMENTS

| | | | | | |
|---|---|---|---|---|---|
| 2,440,783 | A | * | 5/1948 | Peart | 131/236 |
| 2,547,825 | A | * | 4/1951 | King | 446/16 |
| 3,913,260 | A | * | 10/1975 | Corbett | 446/16 |
| 3,971,157 | A | * | 7/1976 | Gillis | 446/19 |
| 4,044,496 | A | * | 8/1977 | Jernstrom | 446/16 |
| 4,576,582 | A | * | 3/1986 | Panzarella | 446/16 |
| D290,859 | S | * | 7/1987 | Nagode et al. | D21/483 |
| 4,764,141 | A | * | 8/1988 | D'Andrade | 446/16 |
| 4,775,348 | A | * | 10/1988 | Collins | 446/16 |
| 4,955,840 | A | * | 9/1990 | Moomaw | 446/17 |
| 5,246,046 | A | * | 9/1993 | Schramm | 141/98 |

OTHER PUBLICATIONS

TV Guide, Lawrence Welk Bubble Machine, 1961, 1 page.*
Best Sales Cat., Fisher-Price Bubble Mower, no date, p. 35.*
Fisher-Price, Bubble Machine, package, 1992, 1 page.*
Fisher-Price, Bubble Sax, package, no date, 1 page.*
Toi, sales literature for Model 2700, 1992, 1 page.*
Tyco, Bubble Firetruck, package, no date, 1 page.*
Royal Contor, S.R.M. Co. Inc., Bubble Machine, package, 1992, 1 page.*
Remco Toys Inc., Instructions to Bubble Blowing Glider, 1992, 2 pages.*
Tootsietoy, Div. of Strombecker Corp., Mechanical Bubble Airplane, Package, 1988, 1 page.*

* cited by examiner

*Primary Examiner* — Steven O Douglas
(74) *Attorney, Agent, or Firm* — Michael R. Schramm

(57) ABSTRACT

The spill resistant bubble machine is an invention that because of its unique geometry and design, prevents spillage of liquid when filled to the fill line or below, and oriented in any position. At the same time the invention is capable of automatic and continuous bubble generation. It is principally intended for use by young children in the hands free automatic generation of bubbles, especially while riding a bicycle, without spilling its liquid contents.

12 Claims, 6 Drawing Sheets

SPILL-PROOF BUBBLE MACHINE

Matter enclosed in heavy brackets [ ] appears in the original patent but forms no part of this reissue specification; matter printed in italics indicates the additions made by reissue.

This application is a continuation of application Ser. No. 07/828,345 now U.S. Pat. No. 5,246,046 filed Jan. 30, 1992. The benefit of the filing date of this earlier filing date is claimed under 35 U.S.C.§ 120.

BACKGROUND OF THE INVENTION

The present invention relates to improved containers which offer spill resistance for their liquid contents. The invention has particular application for use with bubble solution of the type used by children in blowing bubbles.

As is well known to any person who has blown bubbles through a wand, the typical container for bubble solution is cylindrically shaped. This typical container has a circular mouth at its top through which a wand is inserted to access the bubble solution. As is equally well known to bubble-blowers, tipping, knocking over, or in any other fashion upsetting the vertical orientation of such containers permits easy spilling of the bubble solution.

In the present inventor's co-pending application identified above, a spill proof bubble solution container is disclosed. Access to the solution in the invention of the prior application is obtained through an elliptical mouth and a rectangular, depending funnel. The user inserts a bubble wand into the mouth, through the funnel where the wand comes into contact with the bubble solution. The bubble solution is filled to a predetermined level in the container. The predetermined level is identified as the level at which approximately eight ounces of solution rises inside the container. (Eight ounces is the industry standard size for typical cylindrical bubble solution containers.) The funnel is positioned such that the level of solution in the container, when filled at or below the fill line, is below the funnel. Thus, the bubble solution is prevented from entering the funnel for discharge therethrough regardless of the orientation of the container. In this fashion, a user can access the bubble solution with a wand without fear of spillage.

Blowing a large stream of bubbles through use of a wand having only one circular opening is a tedious and often difficult task, especially for a child, requiring repeated insertions of the wand into the container. As will be described hereinafter, the present invention takes advantage of the spill-proof features described in the referenced copending application and provides a method of generating a continuous stream of bubbles when placed in an airstream or moved through the air.

SUMMARY OF THE INVENTION

The present invention relates to a spill-proof container having an upper shell, a lower shell, a bubble wheel, a bubble wheel axle, a bubble wheel gear, a fan, a fan axle, a fan gear and a bubble wheel trough. The upper shell is releasably attachable along one plane of attachment to the lower shell in symmetrical arrangement. A rectangular opening is formed at the top surface of the upper shell which also serves as the opening of a rectangular funnel which depends into the interior of the container. Both the forward and rear lower most edges of the rectangular funnel are fitted with a snap receptacle for a bubble wheel axle described below. A bubble wheel trough is formed in the lower shell for permitting free rotation of the bubble wheel about the bubble wheel axle and for optimizing bubble solution consumption efficiency. A second opening is formed in the upper shell for receiving a fan axle. The fan axle extends from the exterior surface of the upper shell near its leading edge, through a fan axle slot parallel to the plane of attachment of the upper shell and lower shell, and into the opening defined by the depending rectangular funnel. A fan is attached to the exterior end of the fan axle and a fan gear is attached to the opposite or interior end of the fan axle. A circular bubble wheel having a bubble wheel axle and a bubble gear is placed within the rectangular funnel in rotating engagement with the bubble wheel axle snap receptacles. When placed in this position, the bubble wheel gear is in rotating engagement with the fan gear. A predetermined amount of bubble solution is placed within the container formed by the joinder of the upper and lower shells through a capped third opening in the upper shell. When filled with the predetermined amount of bubble solution, the level of solution within the container is prevented from entering the rectangular funnel for discharge therethrough in a manner described in the co-pending application referenced above.

Accordingly, it is an object of the present invention to provide a spill-proof container for the automatic generation of a continuous bubble stream by placing the present invention in an airstream. The airstream will rotate the fan, fan axle and fan gear causing rotation of the bubble wheel through the bubble trough. A plurality of bubble orifices placed on the outer periphery of the bubble wheel thus rotates into the bubble trough, picks up a thin film of bubble solution, continues its rotation within the rectangular funnel until the bubble orifices are protruding outside of the container. The airstream "blows" bubbles with the bubble film thereby vacating the bubble orifices. Continued rotation of the bubble wheel results in a continued exposure of bubble film to the airstream.

DESCRIPTION OF DRAWINGS

The objects and many attendant advantages of this invention will be readily appreciated and become readily apparent as the same becomes better understood by reference to the following detailed description, when considered in conjunction with the accompanying drawings and in which like reference numerals designate like parts throughout the figures thereof and wherein.

DETAILED DESCRIPTION OF THE PREFERRED EMBODIMENT

Figure 1:
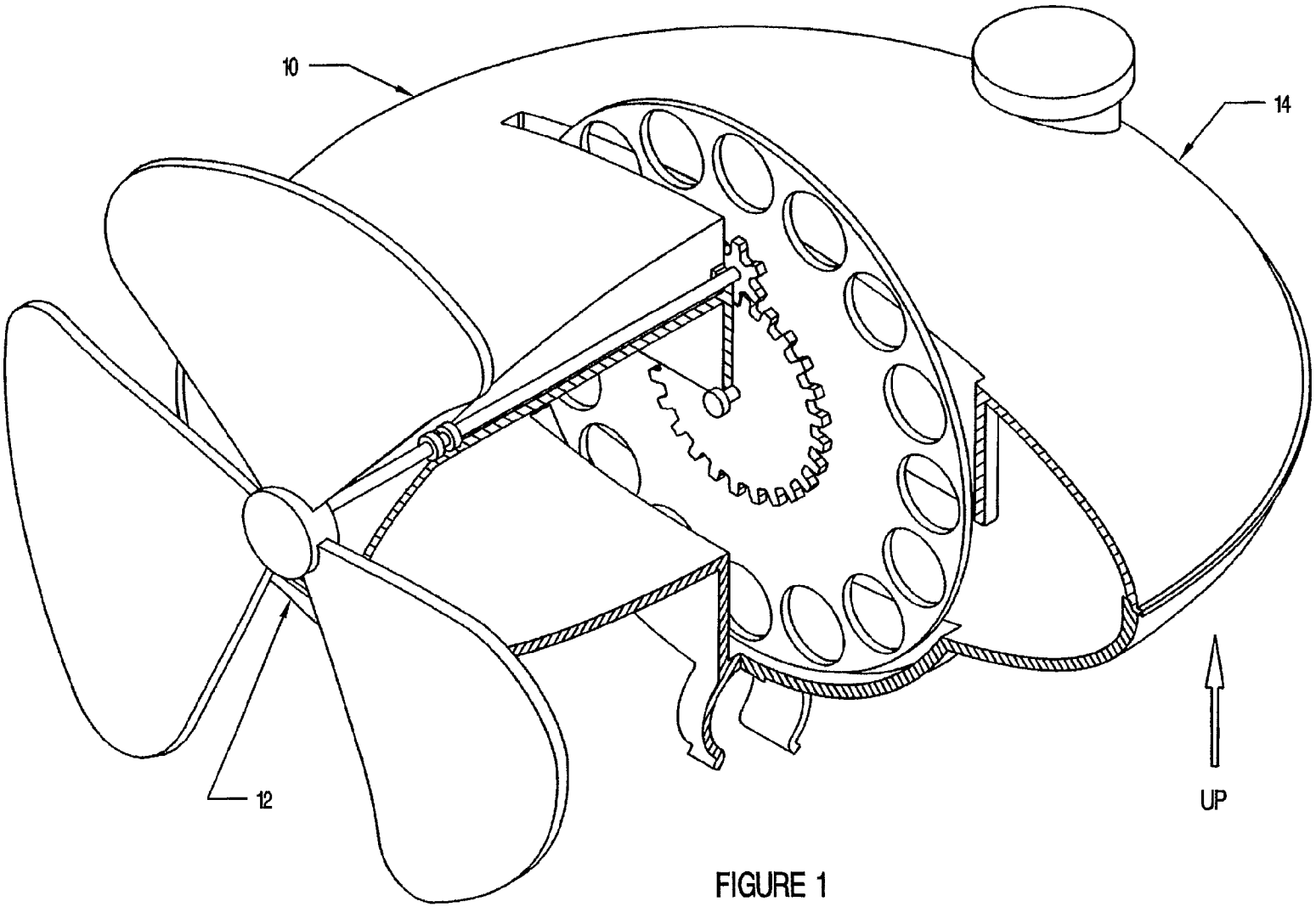
FIG. 1 is an isometric assembly view of the spill resistant bubble machine (rotated 90 degrees counterclockwise to facilitated a larger scale figure), with the front right section of the upper and lower shells cut away.
Figure 2:
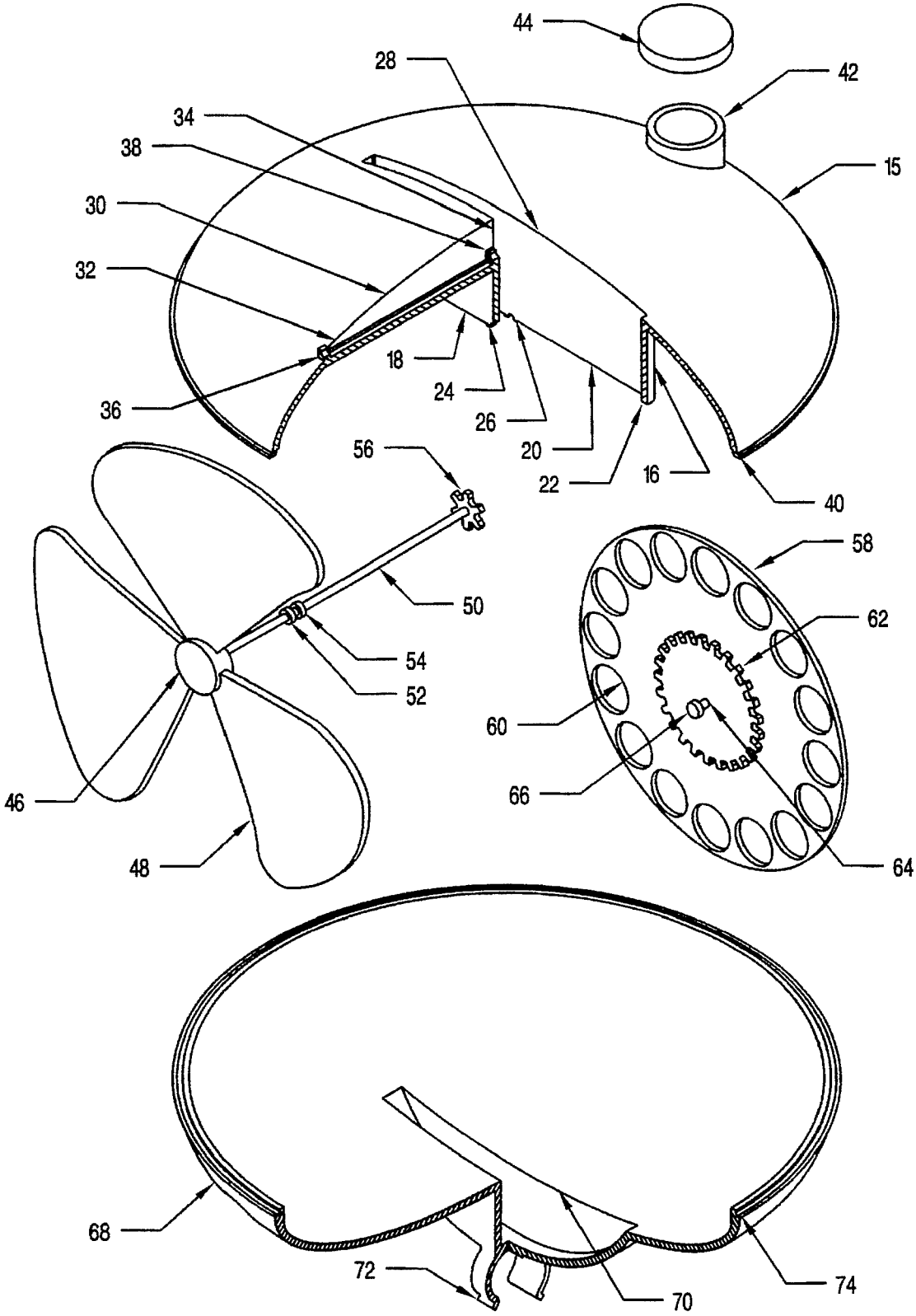
FIG. 2 is an exploded view of the various parts that make up the spill resistant bubble machine, with the front right section of the upper and lower shells cut away, and it illustrates their relationship to each other.

Referring now to the drawings and particularly to FIGS. 1 and 2, the invention is a machine that comprises an upper shell 15 and a lower shell 68. The upper shell 15 has an upper snap seal edge 40 surrounding the upper shell at the lower edge of the upper shell. The lower shell has a lower snap seal edge 14 which is releasably receivable within the upper snap seal edge 40. When placed in snapping engagement, the upper shell and lower shell comprise the spill-proof container 10 of the present invention.

The container 10 has a forward edge 12 and a rear edge 14. Upper shell 15 has an opening 28 at the top of the upper shell 15. Opening 28 defines the opening of a rectangular funnel 16 which depends into the interior of the container 10. The rectangular funnel 16 is defined by a first vertical wall 18 facing the forward edge 12 of the container 10, and a second vertical wall 20 facing the rear edge 14 of the container 10. The lower edge 22 of the funnel 16 is fitted with snap receptacles 24 and 26 for receiving bubble wheel axle 64 of a bubble wheel 58. Upper shell 15 has an opening 32 near forward edge 12 of the container 10 which defines the opening of a fan axle slot 30. Fan axle slot 30 extends from opening 32 at the forward edge 12 of container 10 to a second opening 34 in the first vertical wall 18 of the funnel 16. A snap receptacle 36 is positioned at or near the opening 32 of fan axle slot 30, and a second snap receptacle 38 is positioned at or near the second opening 34 in vertical wall 18 of funnel 16. A fan axle 50 extends through fan axle slot 30 from the exterior of the container 10 to the opening 28 in the rectangular funnel 16. A forward fan axle retaining flange 52 is positioned at the forward edge of the fan axle 50. A fan gear 56 is integrally attached to the rear edge of fan axle 50.

A bubble wheel trough 70 is formed within the lower shell 68 of container 10. Bubble wheel axle 64 is placed at the geometric center of bubble wheel 58 and provides an axis of rotation for bubble wheel 58. Bubble wheel 58 also has a bubble wheel gear 62 which is coaxially mounted with bubble wheel axle 64. When secured within the container 10 by bubble wheel axle 64 being placed in snapping engagement with snap receptacles 24 and 26 on the lower edge 22 of funnel 16, bubble wheel gear 62 is in cooperative relation to fan gear 56. Bubble wheel 58 also includes a plurality of bubble orifices 60 located at or near the periphery of bubble wheel 58.

Figure 3:
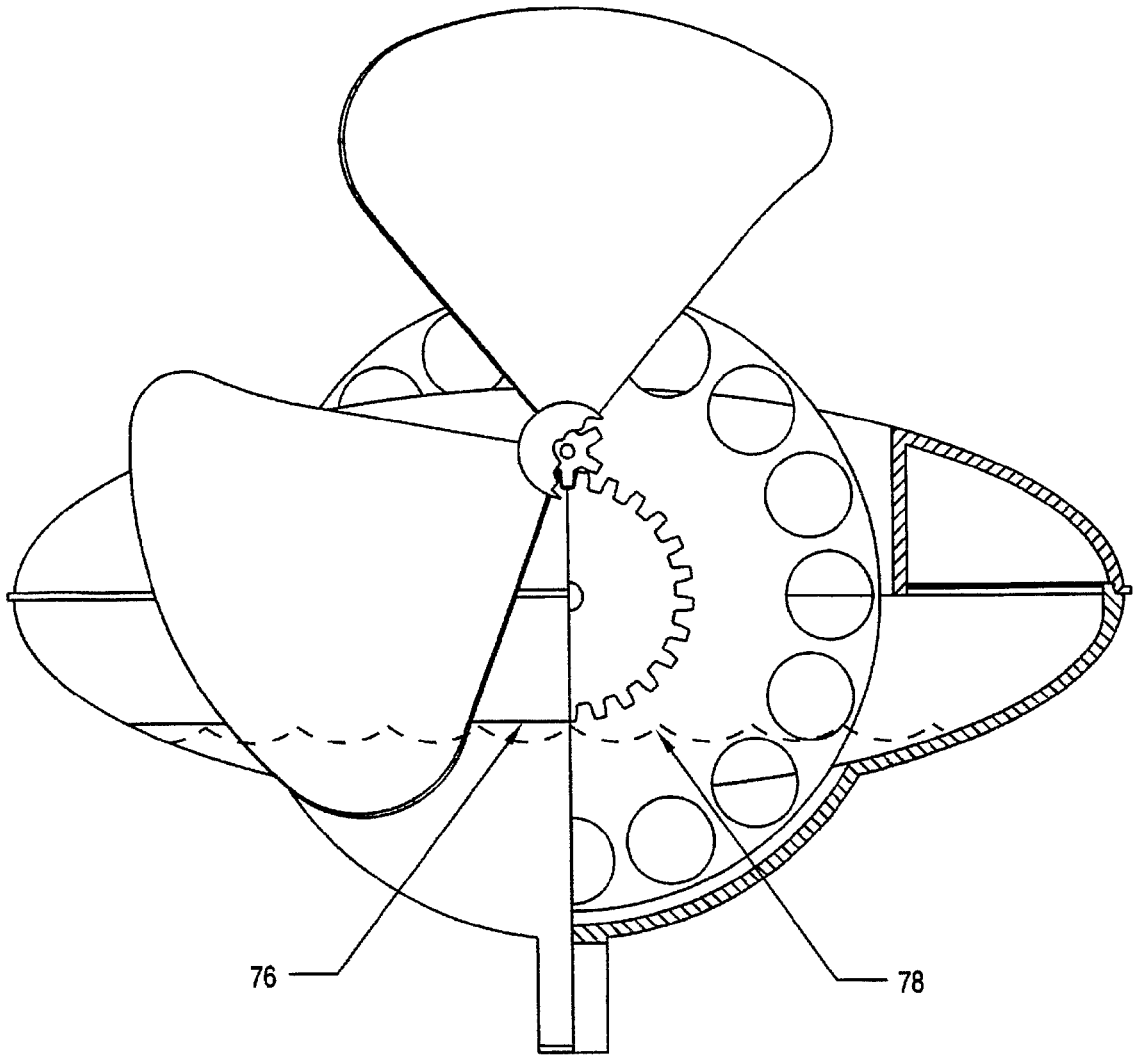
FIG. 3 is a front view of the spill resistant bubble machine, with the front right section of the upper and lower shells cut away, in the upright or vertical position. The bubble solution is shown retained in the bottom of the lower shell.

As is readily apparent from FIGS. 1 and 3, an airstream directed at fan blades 48 of fan 46 will impart a rotating impulse to the fan 46 and fan axle 50. Rotation of fan axle 50 imparts a corresponding rotation to fan gear 56. Fan gear 56 meshes with bubble wheel gear 62 causing bubble wheel 58 to counter-rotate about its axle 64 in response to torque delivered to bubble wheel gear 62. Rotation of the bubble wheel 58 and corresponding rotation of bubble orifices 60 causes bubble orifices 60 to enter and exit bubble wheel trough 70 at the lower portion of rotation of bubble wheel 58. When container 10 contains sufficient bubble solution, a thin film of bubble solution will adhere to bubble orifices 60 when passing though bubble wheel trough 70. When bubble orifices 60 continue their rotation through the upper portion of rotation, the bubble orifices 60 are exposed to the air flow, resulting in production of bubbles.

Figure 5:
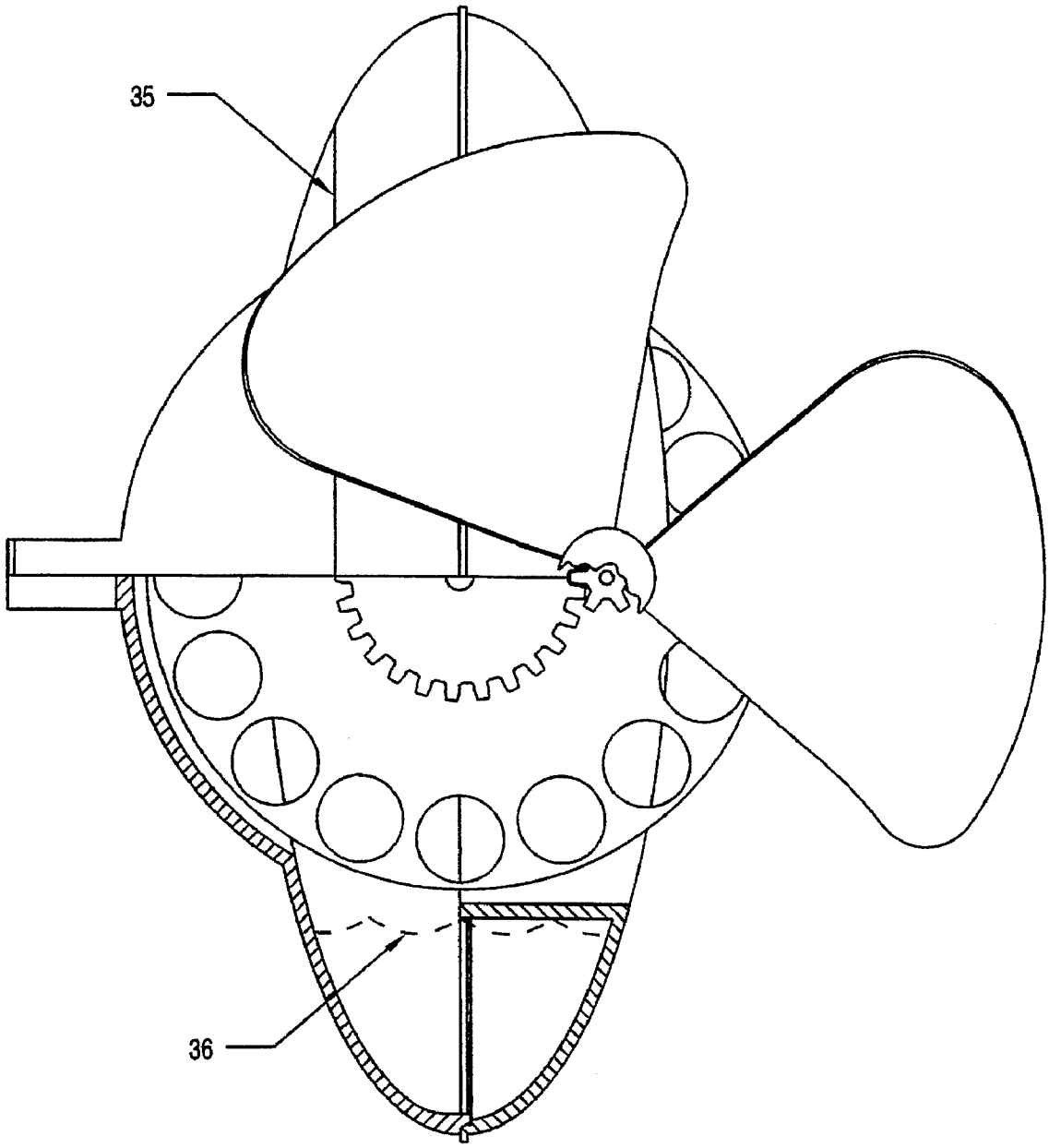
FIG. 5 is a front view of the spill resistant bubble machine, with the front right section of the upper and lower shells cut away, in a sideways position. The bubble solution is shown retained in the current lower side of the upper and lower shells.

As can be seen by reference to FIG. 2, bubble wheel gear 62 has a diameter less than the diameter of the bubble wheel 58. The bubble wheel 58 is prevented from inadvertently becoming detached from snap receptacles 24 and 26 by bubble wheel axle retaining flanges 66. Retaining flanges 66 also act to keep bubble wheel 58 from rubbing against the sides of vertical walls 18 and 20 of funnel 16. As is also apparent from FIG. 2, fan gear 56 has a diameter substantially less than the diameter of bubble wheel gear 62. Upper shell 15 of container 10 has a fill spout 42 and a fill spout lid 44. Bubble solution is poured into the interior of the container 10 through fill spout 42 to a predetermined level as indicated by fill line 76. The maximum fill line 76 is placed no higher on the lower shell than to equal the volume defined by the maximum liquid that can be held in the machine without running out of the funnel 16 when oriented in the sideways position shown in FIG. 5.

Figure 4:
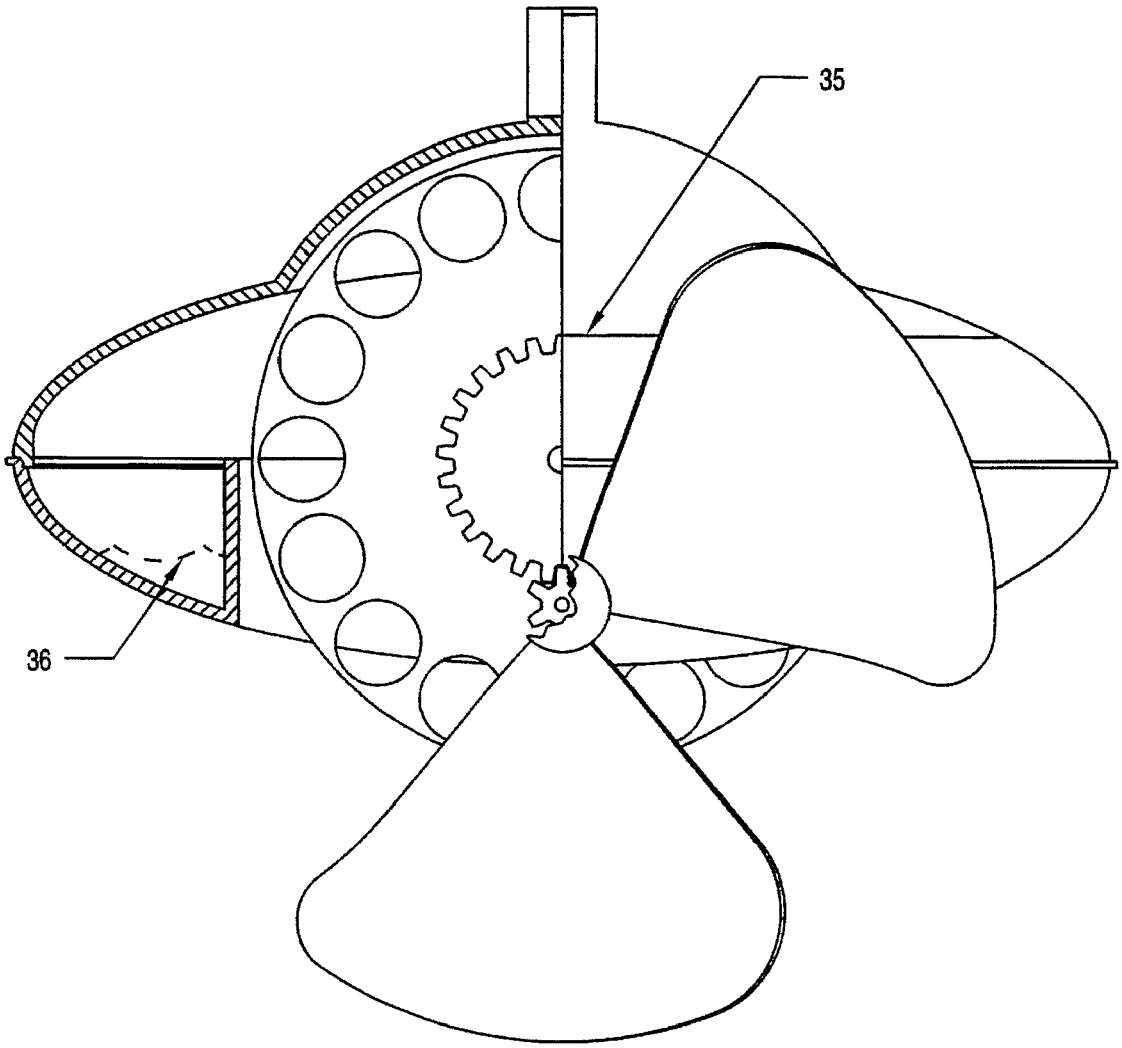
FIG. 4 is a front view of the spill resistant bubble machine, with the front right section of the upper and lower shells cut away, in the upside down position. The bubble solution is shown retained in the top of the upper shell.
Figure 6:
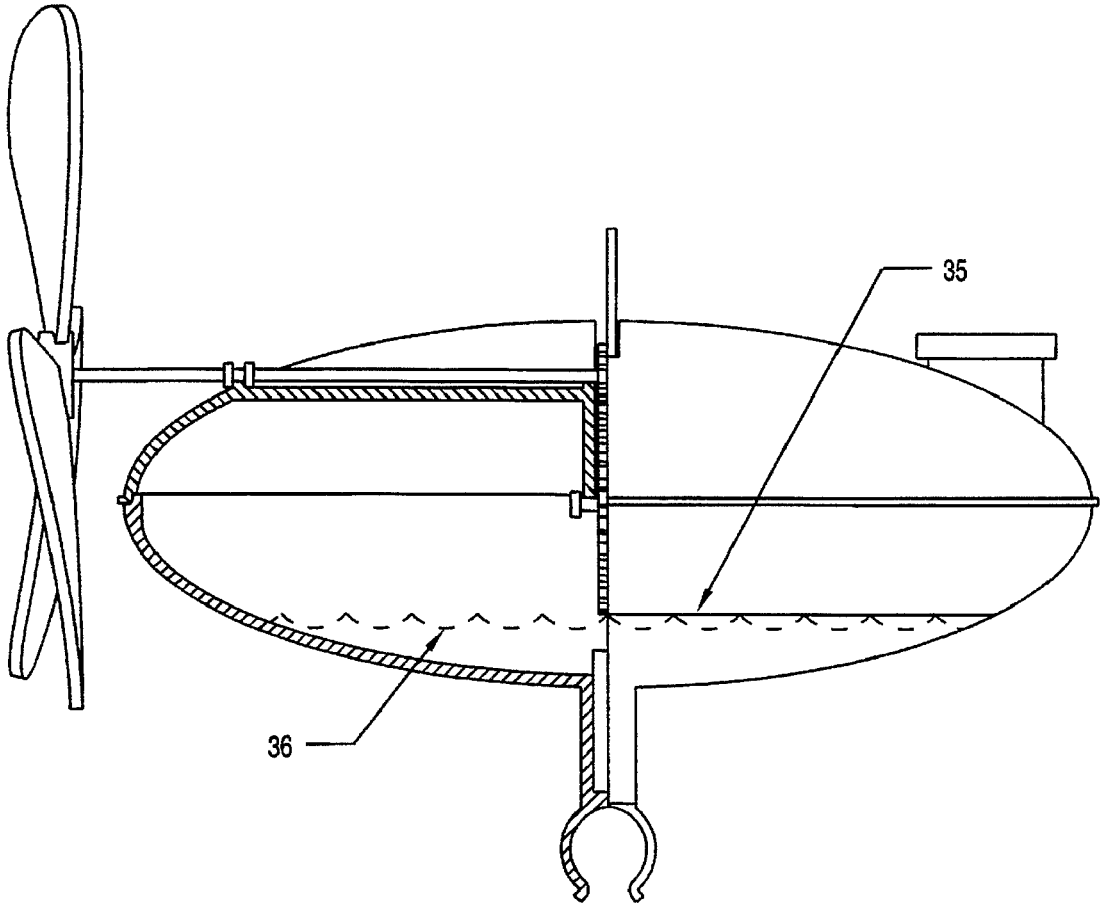
FIG. 6 is a right side view of the spill resistant bubble machine, with the front right section of the upper and lower shells cut away, in the upright or vertical position. The bubble solution is shown retained in the bottom of the lower shell.

FIG. 4 illustrates the additional unique advantages of spill resistance when fluid is filled at or below the fill line 76 in the subject invention regardless of the various possible orientations. As is apparent from FIGS. 3 and 6, when the invention is in the upright position liquid will always be below the lower edge 22 of funnel 16. When container 10 is in the upside down position as in FIG. 4, the liquid will occupy the space immediately around the funnel 16 but not be able to enter funnel 16 for discharge through opening 28. When container 10 is in a sideways position as in FIG. 5, the liquid level will always be between the side of the funnel 16 and the lower side of the two shells. Furthermore, when the container 10 is oriented in any of an infinite variations of the above described positions, it will behave in a like manner and prevent the spillage of the solution.

As is seen by reference to FIGS. 1 and 2, in the preferred embodiment, the spill resistant bubble machine of the subject invention includes a snap-on receptacle 72 for mounting the invention to a bar or frame, such as a bicycle handle bar. However, other embodiments of the subject invention could readily be fitted with a variety of attachments or extensions. In an alternative embodiment of the subject invention, a handle is provided attached to the under side of lower shell 68 for a person (especially a child) to hold to. The handle permits the user to either run with or wave the spill resistant bubble machine to produce bubbles. In yet another alternative embodiment, the subject invention is mounted in a swivelable relation to a shaft or stake with a swivel base and a rudder attached at one end thereof. In this embodiment, the invention will act as a weather vane to produce bubbles in what ever direction the wind is blowing.

In the preferred embodiment of the subject invention, the container 10 defined by upper shell 15 and lower shell 68 has an elliptical cross section to more readily take advantage of principles of aerodynamics and to optimize bubble production. In the preferred embodiment, the elliptical shape of shells 15 and 68 provide an efficient bubble solution consumption ratio (as defined by the ratio of the maximum volume of solution usable when filled to the fill line, divided by the total volume of solution when filled to the fill line). The elliptical shape also provides an efficient volume ratio (defined by the volume of solution when filled to the fill line, divided by the total internal shell halves combined volume).

The approximate size of the upper and lower shells 15 and 68 is defined by a vertical elliptical cross section taken through the center of the shells having a major diameter oriented horizontally and greater than the length of the minor diameter. The fill line 76 is located approximately half way up from the bottom of the lower shell 68 (excluding the snap on receptacle 72) on the shell 68. This allows for a reasonable solution capacity. In a preferred embodiment, the solution capacity is approximately eleven cubic inches.

The shell halves 15 and 68 could be made as one piece but are considered to be in a preferred configuration for fabrication, assembly, and cleaning purposes. The fan 46 and bubble wheel 58, could have been made as one part without gearing, but it would have compromised the volume efficiency and internal liquid flow of the upper shell half 15. Furthermore, with gearing the fan 46 to the bubble wheel 58, the rate of revolution of the bubble wheel 58 to the rate of revolution of the fan 46 can be reduced such as to assure sufficient torque to rotate the bubble wheel through the solution for a given air speed, so that the slower rate of revolution of the bubble wheel 58 will minimize turbulence or cavitation in the bubble solution, and so a bubble orifice 60 will have sufficient exposure time in both the bubble solution and the air flow. It also allows for changing the fan 46 for one of a greater or smaller size to compensate for greater or lesser wind speeds without changing any other parts.

While the shape of the subject invention could vary within the functionality requirements previously described, doing so would not depart from the spirit of the invention. In its current configuration, the subject invention is considered both aerodynamically and consumption efficient as well as aesthetically pleasing.

Lastly, the preferred method of fabrication would be injection molding for high volume low cost production. The material used could be any of a variety of materials such as polyethylene, polypropylene, polyester, nylon, etc. that are compatible with the injection molding process. The material chosen should be transparent or translucent to reveal the content level, and it should also be dishwasher safe. The upper and lower container shells 15 and 68 are also designed to snap together. The four pieces snapped together (upper shell 15, lower shell 68, bubble wheel 58, and fan 46) and the attached cap constitute the assembly.

While there is shown and described herein certain specific structure embodying the invention, it will be manifest to those skilled in the art that various modifications and rearrangements of the parts may be made without departing from the spirit and scope of the underlying inventive concept. The subject invention is not limited to the particular forms herein shown and described except insofar as indicated by the scope of the appended claims.

I claim:

1. A non-spill container for the automatic and continuous generation of bubbles wherein said container comprises an upper shell and a lower shell, said upper shell having an upper integral external ridge defining a lower edge of said upper shell, and said lower shell having a lower integral external ridge defining an upper edge of said lower shell, and wherein said upper integral external ridge is releasably and sealingly mounted in engagement with said lower integral external ridge to form an inner cavity, said container further comprising a leading edge and a trailing edge, and wherein said container includes a rectangular opening formed in a top surface of said upper shell and a rectangular funnel joined to the underside of said top surface of said upper shell depending downward into the inner cavity of said container and terminating with a lower end, said rectangular funnel being in alignment with said rectangular opening to provide communication between the exterior of said container and said inner cavity, said rectangular funnel further having a dimensional width substantially equal to the width of said rectangular opening, and the distance between the lower end of said funnel and any interior surface of said container is greater than a liquid level of a predetermined volume of liquid in said container when placed in any orientation, said container thereby providing resistance to spillage of the liquid contents of said container, and a circular bubble wheel having a diameter greater than the height of said container, and having a plurality of bubble orifices adjacent the periphery of said bubble wheel, said bubble wheel being rotatably mounted within said rectangular funnel.

2. The non-spill container of claim 1 wherein said upper shell and said lower shell define an elliptically symmetrical dome shape.

3. The non-spill container of claim 1 wherein said bubble wheel is attached to a rotating assembly to permit rotation of said bubble orifices adjacent the periphery of said bubble wheel into and out of said inner cavity of said container, thereby permitting bubble solution confined in said inner cavity of said container to adhere to said plurality of bubble orifices when said orifices are rotated into contact with said bubble solution, said rotating assembly further comprising a fan having a plurality of fan blades, said fan being integrally attached to a first end of a fan axle on the exterior of said container, and a fan gear integrally attached to a second end of said fan axle in the interior of said container, said fan gear being in rotating engagement with a bubble wheel gear which is coaxially and integrally attached to said bubble wheel.

4. The non-spill container of claim 3 wherein the lower shell of said container comprises an integral semi-circular trough depending from the lower surface of said lower shell in axial alignment with said rectangular funnel such that the circular path defined by the rotation of said bubble orifices adjacent the periphery of said bubble wheel passes within said rectangular funnel and into said semi-circular trough.

5. The non-spill container of claim 3 wherein the upper shell of said container includes an opening near the leading edge of said container said opening defining a fan axle slot which extends from said opening near said leading edge of said container to the depending rectangular funnel, wherein said fan axle extends through said fan axle slot.

6. The non-spill container of claim 3 further comprising a snap-on receptacle integrally attached to the bottom surface of the lower shell of said container for snappingly attaching said container to a structure exterior to said container.

7. The non-spill container of claim 3 wherein said fan gear is of substantially less diameter than the diameter of said bubble wheel gear.

8. The non-spill container of claim 1 wherein an opening is formed within said upper shell on the top surface thereof, said opening providing communication between the interior of said container and the exterior of said container, and a cap for sealingly closing said opening.

9. A non-spill apparatus for the automatic and continuous generation of bubbles wherein said apparatus comprises a container defining an inner cavity , and wherein said container includes an opening formed in a top surface thereof and a funnel joined to the underside of said top surface of said container depending downward into the inner cavity of said container and terminating with a lower end, said funnel being in alignment with said opening to provide communication between the exterior of said container and said inner cavity of said container and having a dimensional width substantially equal to the width of said opening, the distance between the lower end of said funnel and any interior surface of said container is greater than a liquid level of a predetermined volume of liquid in said container when placed in any orientation, said container thereby providing resistance to spillage of the liquid contents of said container, and a bubble wheel having a plurality of bubble orifices adjacent the periphery of said bubble wheel being rotatably mounted within said funnel.

10. A non-spill apparatus for the automatic and continuous generation of bubbles wherein said apparatus comprises a container defining an inner cavity, and wherein said container includes an opening formed in a wall of said container and a funnel joined to said opening of said wall of said container depending downward into the inner cavity of said container and terminating with a lower end, said funnel being in alignment with said opening to provide communication between the exterior of said container and said inner cavity of said container, and the distance between the inner end of said funnel and any interior surface of said container is greater than *the depth of* a liquid level of a predetermined volume of liquid in said container when placed in any orientation, said container thereby providing resistance to spillage of the liquid contents of said container, and a bubble device having at least one bubble orifice adjacent the periphery of said bubble device being movably mounted within said container.

11. A bubble making apparatus comprising a container defining an inner cavity, and a funnel integrally formed with and extending into the inner cavity of said container to provide communication between said inner cavity and the exterior of said container to inhibit spillage of the contents of said container, and a bubble wheel rotatably mounted within said funnel.

12. A bubble making apparatus comprising a container defining an inner cavity, and a funnel attached to and extending into the inner cavity of said container to provide communication between said inner cavity and the exterior of said container and a bubble device movably mounted to said funnel.

* * * * *